(12) United States Patent
Guo et al.

(10) Patent No.: US 11,385,121 B2
(45) Date of Patent: Jul. 12, 2022

(54) METHOD FOR ACQUIRING UNBALANCE OF ROTOR AND UNBALANCE OF BALANCING MACHINE

(71) Applicant: Beijing SYTH Testing Co., Ltd., Beijing (CN)

(72) Inventors: Weijian Guo, Beijing (CN); Xiaowen Guo, Beijing (CN)

( * ) Notice: Subject to any disclaimer, the term of this patent is extended or adjusted under 35 U.S.C. 154(b) by 0 days.

(21) Appl. No.: 17/447,024

(22) Filed: Sep. 7, 2021

(65) Prior Publication Data
US 2021/0396621 A1 Dec. 23, 2021

Related U.S. Application Data

(63) Continuation of application No. PCT/CN2020/078644, filed on Mar. 10, 2020.

(30) Foreign Application Priority Data

Mar. 12, 2019 (CN) .......................... 201910183704.X

(51) Int. Cl.
*G01M 1/16* (2006.01)
*G01M 1/32* (2006.01)

(52) U.S. Cl.
CPC ................ *G01M 1/16* (2013.01); *G01M 1/32* (2013.01)

(58) Field of Classification Search
CPC .................................. G01M 1/16; G01M 1/32
See application file for complete search history.

(56) References Cited

U.S. PATENT DOCUMENTS

| | | | | |
|---|---|---|---|---|
| 3,882,730 A * | 5/1975 | Laguna | ................... | G01M 1/16 73/462 |
| 4,424,711 A * | 1/1984 | Giers | ...................... | G01M 1/02 73/1.14 |
| 4,513,619 A * | 4/1985 | Widdall | .................. | G01M 1/22 73/455 |

(Continued)

FOREIGN PATENT DOCUMENTS

| CN | 101846573 A | 9/2010 |
|---|---|---|
| CN | 102072797 A | 5/2011 |

(Continued)

OTHER PUBLICATIONS

International Search Report and Wrtien Opinion of PCT/CN2020/078644, dated Jun. 11, 2020.

(Continued)

*Primary Examiner* — Natalie Huls

(57) ABSTRACT

Provided is a method to acquire the unbalance of a rotor and a balancing machine, in which, the method to acquire the unbalance of a rotor includes the following procedures: install angle sensor at first position on balancing machine, measure the unbalance of rotor, first unbalance in measuring plane 1 and first unbalance in measuring plane 2 can be measured. Move angle sensor on balancing machine from first position to second position, measure the unbalance of the rotor again, second unbalance in measuring plane 1 and second unbalance in measuring plane 2 can be measured. In the above mentioned two measurements, the unbalance amount of rotor has no change, but the unbalance angle relative to angle reference point on rotor is changed by an angle which equals the angle of the sensor being moved.

7 Claims, 5 Drawing Sheets

(56) References Cited

U.S. PATENT DOCUMENTS

| | | | |
|---|---|---|---|
| 4,854,168 A * | 8/1989 | Himmler | G01M 1/225 |
| | | | 73/459 |
| 5,421,197 A * | 6/1995 | Ohms | G01M 17/022 |
| | | | 73/146 |
| 5,915,274 A | 6/1999 | Douglas | |
| 10,823,632 B2 * | 11/2020 | Trukenmueller | G01M 1/24 |
| 2005/0119847 A1 * | 6/2005 | Park | G01M 1/34 |
| | | | 702/105 |
| 2016/0349137 A1 * | 12/2016 | Guo | H02K 15/165 |
| 2018/0073953 A1 * | 3/2018 | Guo | G01M 1/30 |
| 2019/0113413 A1 * | 4/2019 | Guo | G01M 1/16 |

FOREIGN PATENT DOCUMENTS

| | | |
|---|---|---|
| CN | 103776587 A | 5/2014 |
| CN | 105021349 A | 11/2015 |
| CN | 105738033 A | 7/2016 |
| CN | 105953979 A | 9/2016 |
| CN | 107478385 A | 12/2017 |

OTHER PUBLICATIONS

Office Action of CN 201910183704.X, dated Jun. 2, 2020.
Notice of Allowance of CN 201910183704.X, dated Jun. 30, 2020.

* cited by examiner

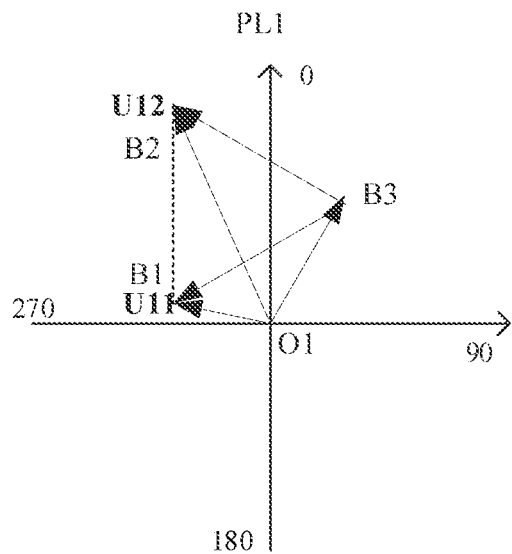
FIG. 5A          FIG. 5B
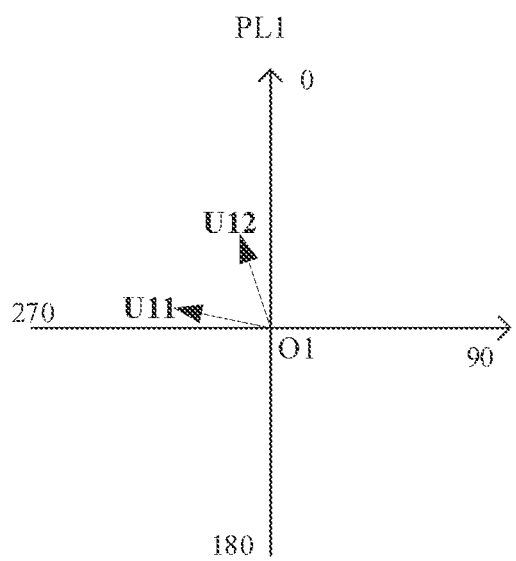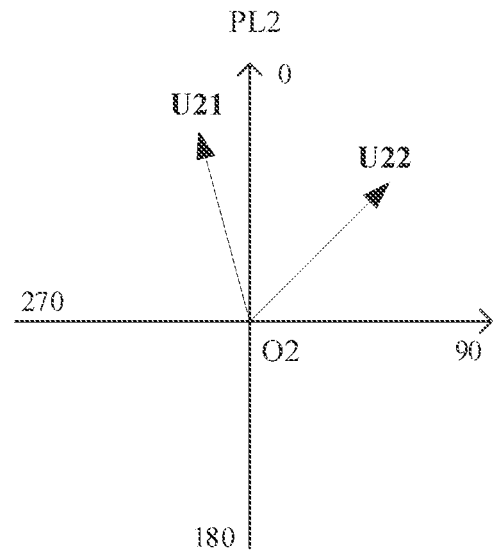
FIG. 6A          FIG. 6B

METHOD FOR ACQUIRING UNBALANCE OF ROTOR AND UNBALANCE OF BALANCING MACHINE

CROSS-REFERENCE TO RELATED APPLICATIONS

This application is a continuation of International Patent Application No. PCT/CN2020/078644 with a filing date of Mar. 10, 2020, designating the United States, now pending, and further claims priority to Chinese Patent Application No. 201910183704.X with a filing date of Mar. 12, 2019. The content of the aforementioned applications, including any intervening amendments thereto, are incorporated herein by reference.

TECHNICAL FIELD OF THE INVENTION

This invention is related to a method to acquire unbalance of a rotor and unbalance of a balancing machine.

BACKGROUND

When a balancing machine detects unbalance of a rotor, the measured unbalance is vector sum of the unbalance of the rotor and unbalance of the balancing machine itself. The unbalance of balancing machine includes zero-point error of balancing machine, electrical compensation unbalance possibly being applied in measuring unit of balancing machine, as well as the unbalance of balance tooling and drive component that being connected mechanically with the rotor being measured.

When balancing machine measures unbalance of a rotor, it is necessary to support the rotor to form rotating axis of the rotor, and to drive the rotor to reach a certain rotating speed. Balancing machines supporting and driving the rotor are classified as two cases:

The first case, when balancing machine support and drive rotor, no mechanical part on balancing machine is rigidly connected with the rotor being measured into one body and rotates together, that is, non-rigid connection, common examples are, horizontal balancing machine use rollers to support the journal of the rotor and use the rollers or belt to drive the rotor to rotate; vertical air bearing machine, the balancing machine support and drive rotor by compressed air.

The second case, when balancing machine support and drive rotor, some mechanical component on balancing machine is rigidly connected with the rotor being measured into one body and is rotating together, common examples are, horizontal balancing machine use drive shaft to drive rotor rotating; vertical balancing machine use tooling to clamp rotor and rotate together.

This invention is only related to the first case. For the first case, the unbalance of balancing machine refers to zero-point error of the balancing machine and electrical compensation unbalance possibly being applied in measuring unit of the balancing machine; But there is no unbalance of tooling and drive component that being connected mechanically with the rotor.

Corresponding to the first case, current existing technology for acquiring the unbalance of rotor and balancing machine is by changing angle reference point on the rotor, or by setting more than one angle reference points on the rotor. The problem of this technology is that, when changing angle reference point on the rotor, since the material being used for reference point always has a certain mass, changing angle reference point will influence the unbalance of the rotor, additionally, because changing angle reference point needs to be done during measuring process, it is not easy to make the angle accurate. When setting more than one reference points on rotor, misusage of reference points can happen.

SUMMARY OF THE INVENTION

In view of above mentioned technical problem, the purpose of this invention is to provide a method by using only one angle reference point made on rotor to acquire the unbalance of rotor and unbalance of balancing machine.

In implementation 1 of this invention, a method for acquiring the unbalance of a rotor is given for decomposing the unbalance of the rotor and balancing machine itself. The specific method is that, setting angle reference point on the rotor, angle sensor is installed on the balancing machine, its position on the balancing machine is first position, when the angle sensor is on the first position, a plane being formed by it and rotating axis of the rotor is first position plane. Use the balancing machine to measure unbalance of the rotor, the measured unbalance is represented as first unbalance in measuring plane 1 which is perpendicular to the rotating axis; Change the position of the angle sensor from the first position to second position on balancing machine, when the angle sensor at the second position, a plane being formed by it and the rotating axis is second position plane, an angle α is formed between the second position plane and the first position plane. Measure the unbalance of the rotor again, the measured unbalance is second unbalance in the measuring plane 1. During the above mentioned two unbalance measurements, the unbalance amount of the rotor has no change, however, the unbalance angle of the rotor is changed by an angle α relative to the angle reference point on rotor. Moreover, during above mentioned two measurements, the unbalance amount and angle of the balancing machine itself has no change. Accordingly, obtain the unbalance of the rotor by using vector calculation.

Implementation 1 can be used for the rotor with a relatively small ratio of length to diameter, selecting one measuring plane to represent its unbalance.

Implementation 2 is a method based on Implementation 1, the specific method is that, when angle sensor is in the first position plane, using the balancing machine to measure the unbalance of the rotor, the measured unbalance is represented by two planes perpendicular to the rotating axis, that is, by first unbalance in measuring plane 1 and first unbalance in measuring plane 2; when angle sensor is in the second position plane, using the balancing machine to measure the unbalance of the rotor again, the measured unbalance is represented by second unbalance in the measuring plane 1 and second unbalance in the measuring plane 2. Accordingly, obtain the unbalance of the rotor in two measuring planes by using vector calculation.

Implementation 2 is to select two measuring planes to represent the unbalance of a rotor. For most rotors, selecting two measuring planes can represent its unbalance more accurately.

Implementation 3 is a method based on Implementation 1 or Implementation 2, after measuring and calculating to obtain the unbalance of a rotor, make correction for the unbalance of rotor so that the unbalance of rotor equals to zero or is less than a setup value. In this way, a rotor with zero unbalance or with unbalance less than a setup value is acquired.

Implementation 4 provides a method to acquire the unbalance of a balancing machine, for decomposing the unbalance of a rotor and a balancing machine, select one measuring plane, the method is that, set angle reference point on the rotor, angle sensor is installed on the balancing machine, its position on the balancing machine is first position, when the angle sensor is on the first position, a plane being formed by it and the rotating axis of the rotor is first position plane; use the balancing machine to measure the unbalance of the rotor, the measured unbalance is represented by first unbalance in measuring plane 1 which is perpendicular to the rotating axis; move the angle sensor from the first position to second position on balancing machine, when the angle sensor is on the second position, a plane being formed by it and the rotating axis of the rotor is second position plane, an angle α is formed between the second position plane and the first position plane; measure the unbalance of the rotor again, the measured unbalance is second unbalance in the measuring plane 1; during above mentioned two unbalance measurements, the unbalance amount of the rotor has no change, however the unbalance angle of the rotor is changed by angle α relative to the angle reference point on the rotor. Moreover, during above two measurements, the unbalance amount and angle of the balancing machine itself has no change. Accordingly, obtain the unbalance of the balancing machine by using vector calculation.

Implementation 5 is a method based on Implementation 4, but select two measuring planes for unbalance measuring, respectively measuring plane 1 and measuring plane 2. The method is that: when angle sensor is on the first position plane, use the balancing machine to measure the unbalance of the rotor, the measured unbalance is represented by two planes, that is, first unbalance in measuring plane 1 and first unbalance in measuring plane 2; When angle sensor is on the second position plane, use the balancing machine to measure the unbalance of the rotor again, the measured unbalance is represented by second unbalance in the measuring plane 1 and second unbalance in the measuring plane 2. By using vector calculation, obtain the unbalance of the balancing machine in two measuring planes.

Implementation 6 is a method based on Implementation 4 or 5, after obtaining the unbalance of the balancing machine, make electrical compensation to the unbalance of the balancing machine so that the unbalance of the balancing machine is zero. Accordingly, the balancing machine with zero unbalance is acquired.

Implementation 7 is a method based on Implementation 6, when the second unbalance in the measuring plane 1 and the first unbalance in the measuring plane 1 has the same amount and an angle difference a, it is judged that the unbalance of balancing machine is zero in the measuring plane 1; when the second unbalance in the measuring plane 2 and the first unbalance in the measuring plane 2 has the same amount and an angle difference a, it is judged that the unbalance of balancing machine is zero in the measuring plane 2.

This invention only needs to set one angle reference point on rotor, by changing angle sensor position on balancing machine to obtain the unbalance of rotor and balancing machine. The installation position of angle sensor can be made precisely in advance, so that changing the angle of angle sensor can be done precisely and can be implemented easily.

BRIEF DESCRIPTION OF THE DRAWINGS

FIG. 5A and FIG. 5B are vector diagrams for decomposing and calculating the unbalance of a rotor and a balancing machine;

FIG. 6A and FIG. 6B are diagrams showing the relationship between second unbalance and first unbalance when the unbalance of balancing machine is zero;

FIGS. 7A-7B show schematic sketch of a horizontal balancing machine using roller to support and drive a rotor, in which, FIG. 7A is a main view, and FIG. 7B is a side view.

DETAILED DESCRIPTION OF THE EMBODIMENTS

A sample implementation of this invention is prescribed in this section with the help of the drawings. For easier explanation, the implementation procedures are basically in the order of the realization of this invention, but some sections are not sequential, and the prescribed procedure is not unique. The procedure as below is for illustrative purpose, not all the steps are necessary, as long as that the invention can be realized. The method and procedure prescribed in this section do not in any way limit the protection area of this invention.

Figure 1:
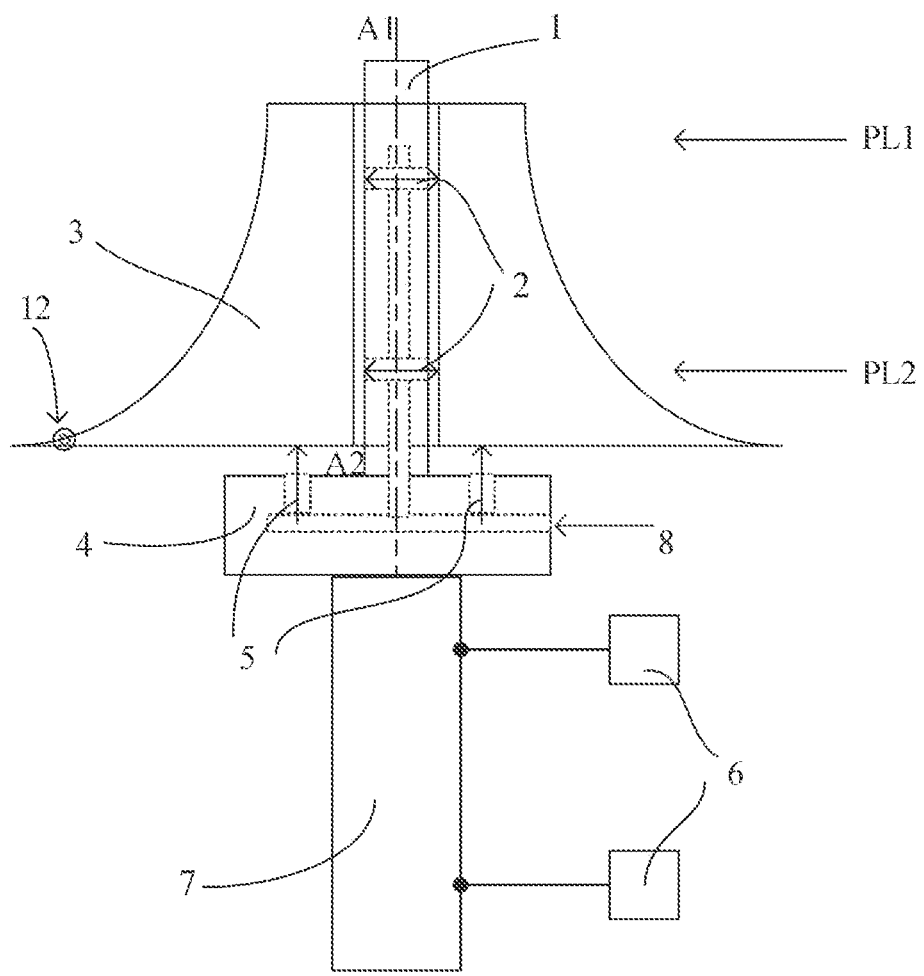
FIG. 1 shows main view of a vertical balancing machine measuring a compressor wheel.

(A) FIG. 1 shows a main view of a vertical balancing machine measuring a turbocharger compressor wheel (abbreviated as compressor wheel hereafter). Compressor wheel is sometimes also called as rotor 3 in the following section. Balancing machine is equipped with radial air bearing 1 to support rotor 3, the air bearing has two rows of small holes 2 being arranged horizontally; balancing machine is equipped with end air bearing 4 on which a circle of small holes 5 is arranged vertically. When entering compressed air 8, end air bearing 4 blows out air through a circle of small holes 5 to make rotor 3 floating, two rows of holes 2 on radial air bearing 1 blow air outward to support the inner hole of rotor 3, forming the rotating axis A1-A2 of rotor 3. Air bearing 1 and air bearing 4 is mounted on vertically arranged balancing machine pedestal 7, and balancing machine pedestal 7 connects with two vibration sensors 6 that are for measuring vibration signal.

Figure 2:
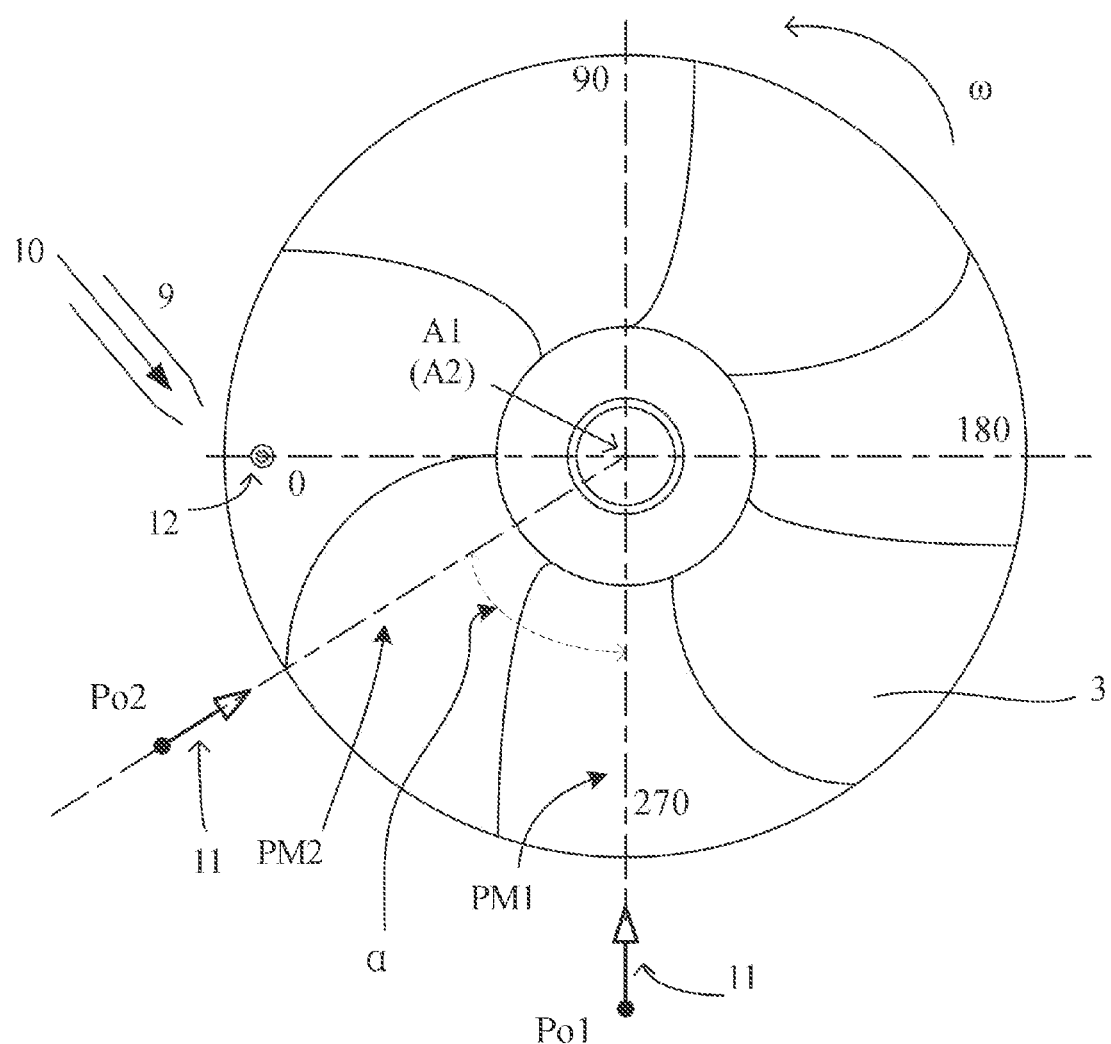
FIG. 2 shows top view of a vertical balancing machine measuring a compressor wheel

FIG. 2 shows top view of the vertical machine measuring a compressor wheel. Compressed air 10 drives rotor 3 rotating through injecting nozzle 9 which is mounted on balancing machine, angular velocity speed is ω, rotating direction is shown by an arrow, that is counter-clockwise direction. Set angle increasing direction of the unbalance of rotor 3 as clockwise, as the marked angle on rotor 3 increases in clockwise direction. When balancing machine measures the unbalance of rotor 3, normally the speed is relatively stable, in this implementation, it is assumed that the speed (or angular velocity ω) of rotor 3 is constant.

Set unbalance angle reference point 12 on rotor 3. Angle sensor 11 is installed on balancing machine. When starting the measurement, angle sensor 11 is on first position Po1. When angle sensor 11 is on first position Po1 of balancing machine, a plane being formed by it and the rotating axis A1-A2 of rotor 3 is noted as first position plane PM1 of angle sensor 11. When reference point 12 on rotor 3 passes through first position plane PM1 of angle sensor 11, angle sensor 11 detects angle reference point 12 on rotor 3 and generates an angle referencing signal. Angle referencing signal is an impulse time signal. For easily explanation, in this implementation, the position of reference point 12 on rotor 3 is defined as the position where unbalance angle of rotor is zero. Such angle definition can be realized by the calibration of balancing machine.

(B) Referring to FIG. 1, select two planes on rotor 3 perpendicular to the rotating axis A1-A2 for measuring the unbalance, respectively called measuring plane 1 PL1 and measuring plane 2 PL2. Use balancing machine to measure the unbalance of rotor 3. The measured unbalance is represented by first unbalance U11 in measuring plane 1 PL1 and first unbalance U21 in measuring plane 2 PL2. The unbalance has amount and angle.

Figure 3A:
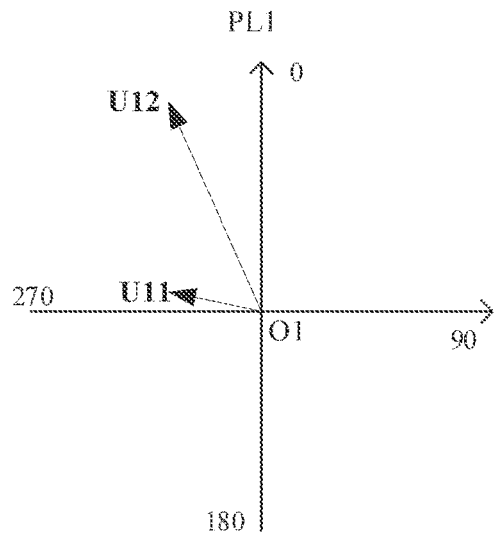
FIG. 3A and FIG. 3B show the measured unbalances.
Figure 3B:
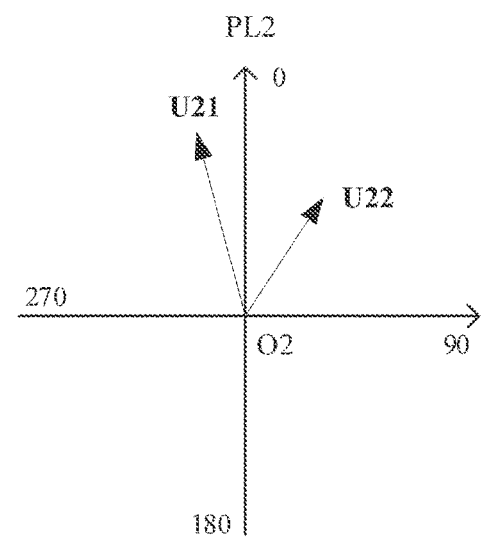

Plot the unbalance LT11 and U21 onto the plane coordinate, as shown in FIG. 3A and FIG. 3B. The origin of the coordinate is zero point for the amount of the measured unbalance, zero degree of the coordinate is zero degree for the angle of the rotor unbalance, that is, the angle of reference point 12.

The measured unbalance LT11 and U21 is vector sum of the unbalance of rotor 3 and the unbalance of balancing machine.

(C) Move angle sensor 11 on balancing machine from first position Po1 to second position Po2. When angle sensor 11 is on second position Po2 of balancing machine, a plane being formed by it and the rotating axis A1-A2 of rotor 3 is noted as second position plane PM2 of angle sensor 11. When reference point 12 on rotor 3 passes through second position plane PM2 of angle sensor 11, angle sensor 11 detects angle reference point 12 on rotor 3 and generates an angle referencing signal.

An included angle between second position plane PM2 and first position plane PM1 of angle sensor 11 can be any angle α. As an example, in this implementation, the included angle between two planes is selected as 60 degrees, that is, the included angle between second position plane PM2 and first position plane PM1 is 60 degree, and second position plane PM2 relative to first position plane is in the opposite direction of rotor rotating.

(D) Measure the unbalance of rotor 3 again, the measured unbalance is represented by second unbalance U12 in measuring plane 1 PL1 and second unbalance U22 in measuring plane 2 PL2. Plot unbalance U12 in measuring plane 1 PL1 and second unbalance U22 in measuring plane 2 PL2 into the plane coordinate, as shown in FIG. 3A and FIG. 3B.

Figure 4:
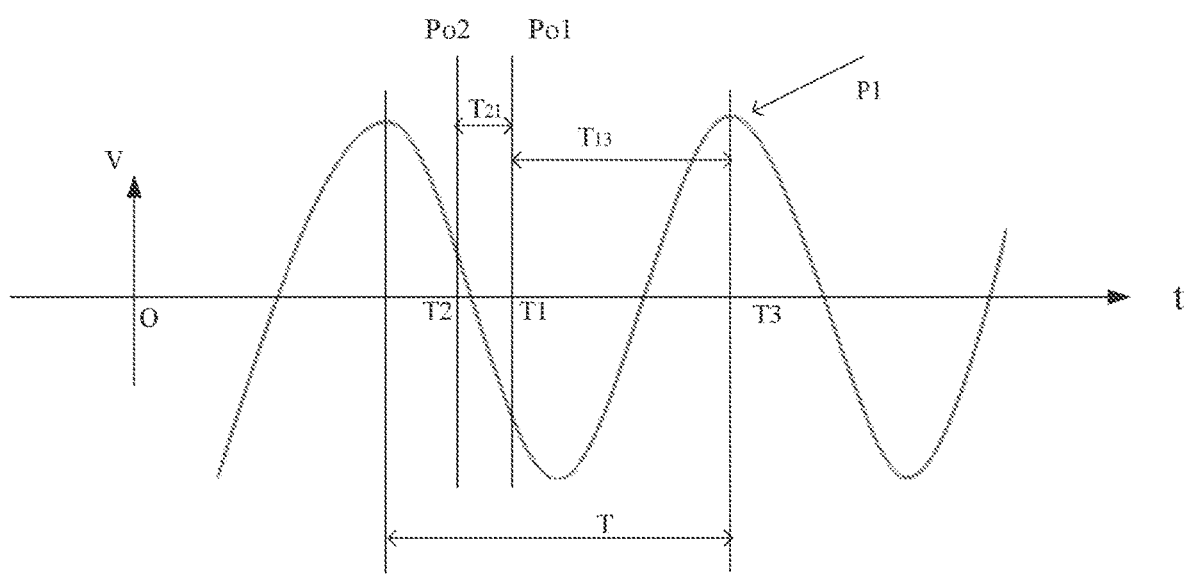
FIG. 4 is a drawing showing the relationship between vibration voltage signal of the unbalance and time signal of angle sensor.

(E) During above two unbalance measurements, the unbalance amount of rotor 3 has no change, but the unbalance angle is changed, that is, the unbalance angle relative to angle reference point 12 on rotor is changed. Referring to FIG. 4, use the angle change of the rotor unbalance in measuring plane 1 for illustration. In FIG. 4, horizontal axis is time t, vertical axis is amplitude of vibration voltage signal detected by vibration sensor 6 due to the unbalance of rotor. The vibration amplitude signal is a sine wave. Every time rotor 3 rotates one circle (360 degree), vibration voltage signal being measured by vibration sensor 6 is a complete sine wave, the period of sine wave is noted as T. The positive maximum vibration amplitude P1 in sine wave is corresponding to the measured unbalance vector of rotor which includes the amount and the angle. The unbalance amount is determined by the magnitude of vibration amplitude P1. Every time rotor rotates one circle (360 degree), angle sensor 11 on balance machine scans reference point 12 on rotor 3 once and gives an impulse time referencing signal. The angle of the rotor unbalance is determined by the relative relationship between the time point of impulse signal being generated when angle sensor 11 detects reference point 12 on rotor and the time point corresponding to maximum amplitude P1 of sine wave signal. In a sine wave along time axis, when angle sensor 11 on balancing machine is on first position Po1 and angle sensor 11 detects reference point 12 on rotor 3, this time point is recorded as T1, the time point along time axis corresponding to maximum amplitude of vibration signal is recorded as T3, time interval between time point T1 and T3 is recorded as $T_{13}$; To divide $T_{13}$ by the time for rotor rotating one round, that is sine wave period T, and further to multiply 360 degree, then it is the angle of the measured unbalance relative to angle reference point 12 on rotor, it is recorded as β, β=$T_{13}$/T*360, or $T_{13}$=β/360*T. After moving angle sensor 11 from first position Po1 on balancing machine to second position Po2, the time point when angle sensor 11 detects angle reference point 12 on rotor during rotor 3 rotating is recorded as T2. Since second position Po2 of angle sensor 11 is 60 degree relative to first position Po1 of angle sensor 11 in the opposite of rotor rotating direction, when considering the time sequence, the time when angle sensor 11 on second position Po2 detects angle reference point 12 of rotor is earlier than the time when angle sensor 11 on first position Po1 detects angle reference point 12 of rotor, that is, the point T2 is earlier than the point T1, the earlier (advanced) time interval is recorded $T_{21}$. This advanced time difference is caused by angle sensor 11 on balancing machine being moved 60 degrees opposite to the rotating direction of rotor 3, that is, caused by rotor 3 rotating 60 degree less in one round, $T_{21}$=60/360*T. After moving angle sensor 11 to second position Po2 on balancing machine, the unbalance angle of rotor is the angle corresponding to the time between the time point T2 and T3. The time between T2 and T3 is the sum of $T_{13}$ and $T_{21}$, that is: $T_{13}$+$T_{21}$=β/360*T+60/360*T=(β+60)/360*T The angle corresponding to the time between T2 and T3 is:

$$(T_{13}+T_{21})/T*360=\beta+60$$

That is, after moving angle sensor 11 on balancing machine to second position Po2, the measured unbalance angle of rotor is changed to (60+β) degree.

(F) In FIG. 2, if moving angle sensor 11 on balancing machine with 60 degrees in the rotating direction of rotor 3, the time when angle sensor 11 on this position detects angle reference point 12 on rotor 3 is later than the time when angle sensor 11 on first position Po1 detects angle reference point 12 on Rotor 3, according to the above analysis, it can be known that the unbalance angle of rotor at this case is changed to β−60 degree. The above analysis is obtained under the condition that rotor 3 rotating direction is opposite to the angle increasing direction of rotor unbalance. If rotor 3 rotating direction is the same with angle increasing direction of rotor unbalance, when moving angle sensor 11 on balancing machine a certain angle opposite to rotor rotating direction, angle of rotor unbalance is changed by reducing this certain angle, when moving angle sensor 11 on balancing machine a certain angle in rotor rotating direction, angle of rotor unbalance is changed by increasing this certain angle.

(G) When the position of angle sensor 11 on balancing machine changes, the unbalance of balancing machine itself, including possible electrical compensation or zero point calibration error, both amount and angle of the unbalance of the balancing machine have no change. This is because the unbalance of balancing machine itself is not the unbalance caused by the mechanical unbalance which generates sine vibration signal, but is only the electrical analogue amount (or digital amount), its amount has no change, its angle only relates to angle reference point 12 on rotor 3 and does not relate to vibration voltage signal of vibration sensor, thus, unbalance angle of balancing machine itself has no relationship with the position change of angle sensor 11.

(H) Based on above mentioned unbalance angle change of rotor 3, as per vector calculating method shown in FIG. 5A and FIG. 5B, the unbalance of rotor 3 and the unbalance of balancing machine are calculated. Taking an example of measuring plane 1 PL1, the specific calculating method is that, name the vector end point of the unbalance U11 as B1 and the vector end point of the unbalance U12 as B2, making an isosceles triangle by using the connecting line of B1 and B2 as the bottom side, top point is B3, top angle is 60 degrees, and when vector B3B1 rotates to vector B3B2, it is angle increasing direction in the coordinates (in the figure, clockwise is unbalance angle increasing direction). Vector O1B3 is the unbalance amount and angle of the balancing machine, Vector B3B1 is the unbalance amount and angle of rotor 3 when angle sensor 11 on first position Po1, vector B3B2 is the unbalance amount and angle of rotor 3 when angle sensor 11 on second position Po2. Vector B3B2 and Vector B3B1 equals in amount, while angle difference is positive 60 degrees, that is, angle of vector B3B2 is increased by 60 degrees comparing to angle of vector B3B1.

(I) When the unbalance of balancing machine is zero, vector O1B3 in measuring plane 1 PL1 is zero, under the condition shown in FIG. 2, when angle sensor 11 is moved 60 degree opposite to rotor rotating direction, the unbalance amount of rotor 3 is no change, but the direction is changed by increasing 60 degree positively, as shown in FIG. 6A and FIG. 6B. Based on this principle, a simple method can be used to detect whether the unbalance of balancing machine is zero, that is, moving angle sensor a certain degree opposite to rotor rotation, if before and after the angle sensor position changes, the measured unbalance amount equals, but the measured angle is positively increased by the moved angle of angle sensor, it is proved that the unbalance of balancing machine is zero.

Figure 7A:
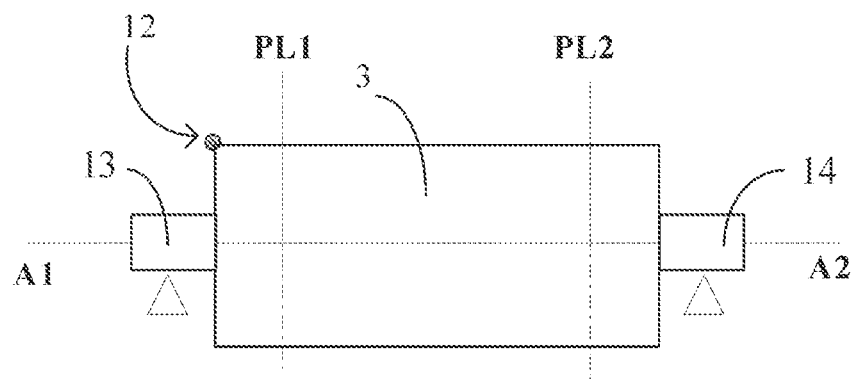
Figure 7B:
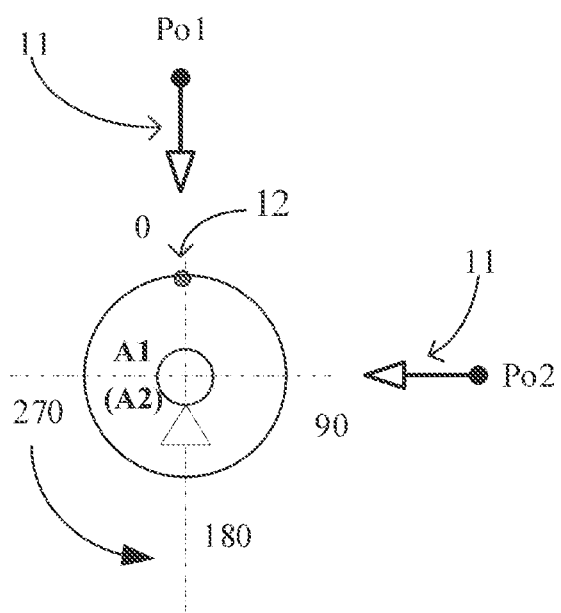

(J) FIG. 7A and FIG. 7B show a sketch of a horizontal balancing machine measuring the unbalance of a rotor, rotor 3 in FIG. 7A and FIG. 7B is supported by rollers of balancing machine on journal 13 and 14 at two ends of rotor, and meanwhile rollers of balancing machine also drive rotor 3 rotating, rotating direction is shown by the arrow in FIG. 7B, that is, counterclockwise direction.

The types for horizontal balancing machine supporting rotor can be bearing sleeves, rollers, V blocks etc., the methods for horizontal balancing machine to drive rotor can be roller drive, belt drive, or air drive etc. but should satisfy the following conditions: when balancing machine supports and drives rotor, no mechanical part on balancing machine is mechanically connected with rotor into one body and rotates together.

Angle reference point 12 is set on rotor 3, angle sensor 11 is installed on balancing machine and its initial position is recorded as first position Po1. As per the same method mentioned above, move angle sensor 11 on balancing machine and measure the unbalance before and after this move, obtain the unbalance of rotor and balancing machine by above mentioned vector calculation.

(K). The above mentioned implementation to acquire the unbalance of rotor and balancing machine is to select two measuring planes of rotor. For rotor with a relatively small ratio of length to diameter, normally it is called as disc type rotor, one plane can be used to measure the unbalance of rotor. The implementation of this invention is also suitable for selecting one measuring plane, to acquire the unbalance of rotor and balancing machine.

(L). After using above mentioned method to measure and acquire the unbalance of balancing machine itself, electrical compensation can be proceeded for balancing machine, so that to make the zero point of balancing machine accurate for it to measure the unbalance of rotor, after the balancing machine being compensated in such way, the unbalance of balancing machine itself is zero, and the unbalance that it measures is the unbalance of rotor.

(M) After using above mentioned method to acquire the unbalance of rotor, make the unbalance correction for rotor, so that the unbalance of rotor is zero or less than a setup value. In this way, a rotor with zero unbalance or with unbalance less than a setup value is obtained.

Above description illustrates the preferred implementation of this invention, this invention is not limited to above mentioned implementation. Based on technical thoughts of this invention, the implementation of this invention can be transformed randomly.

What is claimed is:

1. A method to acquire unbalance of a rotor, for decomposing the unbalance of rotor and unbalance of a balancing machine; wherein when the balancing machine supports and drives the rotor (3), the balancing machine and the rotor being measured is in non-rigid connection, the method comprising the following steps:

setting an angle reference point (12) on the rotor (3), wherein an angle sensor (11) is installed on the balancing machine; when the angle sensor (11) is on a first position (Po1), a plane being formed by the angle sensor and a rotating axis (A1-A2) of the rotor (3) is defined as a first position plane (PM1);

using the balancing machine to obtain a first measured unbalance (U11) of the rotor (3), the first measured unbalance is represented in a measuring plane 1 (PL1) perpendicular to the rotating axis (A1-A2);

moving the angle sensor (11) from the first position (Po1) to a second position (Po2) on the balancing machine; when the angle sensor (11) is on the second position (Po2), a plane being formed by the angle sensor and the rotating axis (A1-A2) of the rotor (3) is defined as a second position plane (PM2); an included angle ($\alpha$) is formed between the second position plane (PM2) and the first position plane (PM1), and the second position plane (PM2) is in an opposite direction of rotor rotation relative to the first position plane (PM1);

using the balancing machine to obtain a second measured unbalance of the rotor in the measuring plane 1 (PL1);

using the first measured unbalance and the second measured unbalance, acquiring, by vector calculation, a calculated unbalance of the rotor (3); the vector calculation comprises:

forming an isosceles triangle by taking a line connecting a vector end of the first measured unbalance and a vector end of the second measured unbalance as a base side, and the included angle $\alpha$ as a vertex angle; wherein, from isosceles side of the vertex to the vector end of the first measured balance to isosceles side of the vertex to the vector end of the second measured balance is clockwise, the vector from the vertex of the isosceles triangle to the vector end of the first measured unbalance is the calculated unbalance of the rotor.

2. The method according to claim 1, wherein: when the angle sensor is on the first position plane (PM1), using the balancing machine to measure the unbalance of rotor (3), the first measured unbalance is represented by two measuring planes perpendicular to the rotating axis (A1-A2);

when the angle sensor is on the second position plane (PM2), using the balancing machine to measure the second measured unbalance of the rotor (3), the second measured unbalance is represented by two measuring planes perpendicular to the rotating axis (A1-A2).

3. The method according to claim 1, after acquiring the calculated unbalance of the rotor, making correction by adding material or removing material to the calculated unbalance of the rotor, so that the calculated unbalance of the rotor is zero or less than a setup value.

4. The method according to claim 1, wherein an acquired unbalance of the balancing machine is acquired by the vector calculation, wherein the calculated unbalance of the balancing machine is the vector from the coordinate origin to the vertex of the isosceles triangle in the vector calculation.

5. The method according to claim 4, wherein the acquired unbalance of the balancing machine is represented by two measuring planes.

6. The method according to claim 5, wherein
after acquiring the acquired unbalance of the balancing machine, making electrical compensation to the acquired unbalance of the balancing machine, so that the acquired unbalance of the balancing machine is zero.

7. The method according to claim 6, wherein
when the second measured unbalance (U12) in the-measuring plane 1 (PL1) and the first measured unbalance in the measuring plane 1 (PL1) equal in amount and have an angle difference of angle ($\alpha$), the acquired unbalance of the balancing machine in the measuring plane 1 (PL1) is zero; when the second measured unbalance in the measuring plane 2 (PL2) and the first measured unbalance in the measuring plane 2 (PL2) equal in the amount and have an angle difference of angle ($\alpha$), the acquired unbalance of the balancing machine in the measuring plane 2 (PL2) is zero.

* * * * *